United States Patent [19]
Hayes et al.

[11] Patent Number: 5,488,085
[45] Date of Patent: Jan. 30, 1996

[54] SEMI-BATCH PROCESS FOR PRODUCING POLYMER POLYOLS

[75] Inventors: John E. Hayes, Wilmington, Del.; Donald W. Simroth, Charleston, W. Va.; Xinhua Zhou, West Chester, Pa.

[73] Assignee: ARCO Chemical Technology, L.P., Greenville, Del.

[21] Appl. No.: 292,531

[22] Filed: Aug. 18, 1994

[51] Int. Cl.$^6$ ............................. C08L 25/12; C08L 75/00
[52] U.S. Cl. ........................... 525/53; 525/187; 525/404; 525/412; 525/455; 525/526; 525/529
[58] Field of Search .................... 525/187, 404, 525/412, 455, 526, 529, 53

[56] References Cited

U.S. PATENT DOCUMENTS

| | | | |
|---|---|---|---|
| 4,148,840 | 4/1979 | Shah | 260/859 |
| 4,198,488 | 4/1980 | Drake et al. | 521/137 |
| 4,316,991 | 2/1982 | Speranza et al. | 568/609 |
| 4,883,825 | 11/1989 | Westfall et al. | 521/112 |
| 4,891,395 | 1/1990 | Gastinger et al. | 523/456 |
| 5,059,641 | 10/1991 | Hayes et al. | 523/456 |
| 5,196,476 | 3/1993 | Simroth | 524/769 |
| 5,223,570 | 6/1993 | Huang et al. | 525/53 |

FOREIGN PATENT DOCUMENTS 0510533  10/1992  European Pat. Off. .

*Primary Examiner*—Thomas Hamilton, III
*Attorney, Agent, or Firm*—Dennis M. Kozak

[57] ABSTRACT

Polymer polyols prepared by a semi-batch process using a small amount of a seed polymer polyol are disclosed. The final polymer polyol has a broader particle size distribution as compared to an identically prepared polymer polyol prepared in the absence of the seed polymer polyol. The polymer polyols are suitable for use in producing polyurethanes, particularly polyurethane foams.

30 Claims, No Drawings

SEMI-BATCH PROCESS FOR PRODUCING POLYMER POLYOLS

FIELD OF THE INVENTION

This invention relates to processes for making polymer polyols. More specifically, this invention pertains to a semi-batch process for producing polymer polyols having broad particle size distributions. Broad particle size distribution is achieved through the addition of a seed polymer polyol.

BACKGROUND OF THE INVENTION

Polymer polyols are commonly used to produce polyurethane foam having improved properties. The presence of the solid polymer particles dispersed in the polyol facilitates cell opening and provides increased loadbearing properties to the resulting polyurethane foam. These foam property improvements are a function of the solid content of the polymer polyol, the polymer particle size, the polymer particle size distribution, and the polymer particle morphology.

U.S. Pat. No. 4,148,840 to Shah teaches a continuous process for improving the stability of polymer polyols by adding a minor portion of a preformed polymer polyol to a base polyol together with the monomers and initiator. Specifically, the preformed polymer polyol minor portion consists of from about 45 to about 5 wt %, most preferably from about 40 to about 10 wt % of the total batch. The preformed polymer polyol portion taught by., Shah is preferably prepared in a high molecular weight polyol or dispersant polyol. No mention of particle size and particle size distribution of the dispersed solid polymer particles is made.

A two step process for preparing polymer polyols having a broad polymer particle size distribution via a semi-batch process is taught in U.S. Pat. No. 5,223,570. The two step process requires preparing an intermediate polymer polyol having a solids content of up to 30% in a continuous process followed by increasing the solids content to above 30% in a semi-batch process. The advantage of this two step process is its ability to produce polymer polyols without wildly fluctuating viscosities. The obvious disadvantage of this method is it requires two different types of reactors.

European Patent Application No. EP 0510533A2 teaches that polymer polyols having improved stability can be prepared with the use of a high molecular weight monol containing terminal unsaturation. The use of a seed dispersion is discussed; however, the seed is a polymer polyol made by polymerizing monomers in the monol stabilized polyol. Moreover, the seed particles have an average particle size of 0.05 to 0.15μ. Polymer polyols with broad particle size distributions are not taught.

Polymer polyols prepared from preformed stabilizers are disclosed in U.S. Pat. No. 5,196,476. The preformed stabilizer is prepared by polymerizing ethylenically unsaturated monomers in a polyol having reactive unsaturation and a liquid diluent.

SUMMARY OF THE INVENTION

Polymer polyols prepared by a semi-batch process typically have a narrow particle size distribution. We have discovered that the addition of a small amount of seed polymer polyol to a semi-batch process results in polymer polyols with broad particle size distributions and reduced viscosities. The particle size distributions achieved by this invention are substantially broader and the viscosities are substantially lower than obtained in the absence of adding the seed polymer polyol. Moreover, control over particle size and particle size distribution is attained, and in many cases the filtration properties of the resulting polymer polyol products are improved. Additionally, this invention facilitates the preparation of dispersions having increased solid contents and higher styrene contents in the polymer particles. According to this invention, there is provided a semi-batch process for preparing polymer polyols having a broad particle size distribution comprising the in-situ polymerization of one or more ethylenically unsaturated monomers in a polyol media and in the presence of a seed polymer polyol, wherein from about 0.25 wt % to about 3 wt % of the total polymer solids in the polymer polyol comes from the added seed polymer polyol.

DETAILED DESCRIPTION OF THE INVENTION

The properties of polymer polyols are dependent upon a number of factors including the amount, shape, size, and size distribution of the dispersed solid polymer particles. Generally, for a given solid content the broader the particle size distribution of the particles the lower the viscosity of the material. Typically polymer polyols prepared by a semi-batch process have a narrow particle size distribution while those produced by a continuous process have a broad particle size distribution. In a batch or semi-batch process polymer particles are generated mainly in the early stages of reaction and later reactions favor the growth in size of existing polymer particles rather than the nucleation of polymer particles. This phenomenon results in a narrow particle size distribution.

We have surprisingly found that the addition of a small amount of seed polymer polyol to a semi-batch process results in polymer polyols with broad particle size distributions. The term "seeding" as used herein, means the technique wherein a preformed polymer polyol (the seed) is added to a batch reactor as an ingredient to produce a new polymer polyol. The seed can be added to the reaction either in the initial reactor charge, or in the monomer feed to the reactor, or in both. In a preferred embodiment, the seed is added in the initial reactor charge together with the base polyol and a dispersant. If the seed is added together with the monomer feed, it may be added continuously or in portions. Moreover, it may be added as a separate feed stream or premixed with the monomers or base polyol and added.

The seed particles, regardless of how or when they are added, act as a nucleus for growth. However, the polymer particle size and distribution in the polymer polyol depends on a number of factors including the amount of seeds, the method of seed addition, and the seed solid content. Surprisingly, adding only a small amount of seed is critical for obtaining the improved properties in the semi-batch process of this invention. By using only a small amount of seed, we were able to achieve new nucleation of particles in addition to size growth of the seeds. When we tested our discovery by adding a large amount of seeds, we found that new nucleation was depressed and there was predominantly growth of the existing seeds. Also, the particle size was reduced, the particle size distribution narrowed, and no improvement in viscosity was seen. Thus, the process of this invention enables control of the mean particle size and particle size distribution of the polymer particles in a semi-batch process. This control is achieved by controlling both the amount of seed and the point at which the seed is added to the semi-batch process. Generally, adding the seed to the monomer or polyol feed results in polymer polyols with particle size distributions which resemble those from a continuous process while adding the seed to the initial reactor charge results in a bimodal particle size distribution.

The solids content of a polymer polyol produced by the process of this invention is equal to the weight of the ethylenically unsaturated monomers used in preparing the polymer polyol plus the weight of the ethylenically unsaturated monomers used in preparing the added seed polymer polyol. For example, to prepare a polymer polyol with a solids content of 45 wt % with 1% of the solids coming from the added seed, you would polymerize 44 wt % monomers; 1 wt % of the total solids would come from the polymer in the added seed. We have found that a critical parameter for seeding in the semi-batch process of this invention is the amount of the polymer solids contributed to the total solids by the added seed.

In the practice of the invention, the amount of polymer solids which comes from the seed is preferably within the range of from about 0.25 to about 3 wt %, more preferably from about 0.5 to about 2.5 wt %, and most preferably from about 0.5 to about 2 wt %. The optimum amount of polymer solids from seed within these ranges is a function of several factors including the solid content of the seed, the solid content of the polymer polyol you are preparing, the monomer ratio, and the method and point of addition of the seed. This critical range (0.25– 3 wt %) of solids from the seed equates to adding from about 0.5 to about 15 wt % of seed polymer polyol to the batch, preferably from about 1 to about 10 wt %, and, most preferably, from about 1 to about 5 wt %. The formula for converting between weight percent of polymer solids coming from the added seed and the weight percent of seed polymer polyol added to the batch is shown below.

(% Solids from Seed÷% Solids Content of Seed Polymer Polyol)× 100= % of Seed Polymer Polyol to add to Batch.

Some examples are shown in the following table (all percents are by weight):

| % Solids from Seed Polymer Polyol | % Solids Content of Seed Polymer Polyol | % of Seed Polymer Polyol to add to Batch |
| --- | --- | --- |
| 0.5 | 20 | 2.5 |
| 0.5 | 50 | 1.0 |
| 1 | 20 | 5.0 |
| 1 | 50 | 2.0 |
| 3 | 20 | 15.0 |
| 3 | 50 | 6.0 |

From the above table, it can be seen that to obtain the same % of solids from seed polymer polyol, you are required to add a smaller % of seed polymer polyol to the batch as the solids content of the seed polymer polyol is increased. As was stated above, the critical factor in the semi-batch process of this invention is the amount of polymer solids which comes from the seed and not the percent of seed polymer polyol that is added to the batch. Moreover, the above relationship is independent of the solids content of the resulting polymer polyol of the invention.

The seed is itself a polymer polyol. Substantially any or all of the prior art processes used to prepare polymer polyols can be used to prepare the seed polymer polyol for use in the process of the invention. The solids content of the seed may range from about 10 wt % to about 60 wt %. For ease of operation, the solids content of the seed is preferably the same as the resulting polymer polyol of the invention but may be lower or higher. The monomers used in preparation of the seed are preferably the same as the monomers used in preparing the polymer polyol of the invention but may be different as long as the two polymer systems are compatible. Styrene and acrylonitrile are preferred comonomers for both the seed polymer polyol and the polymer polyol of the invention. If the preferred monomers are employed, the SAN ratio of the seed is preferably the same as the SAN ratio of the polymer polyol of the invention but may be lower or higher. The SAN ratio of the seed may range from about 40/60 to 100/0, preferably about 65/35 to about 90/10. The base polyol used in preparing the seed may be the same or different than the base polyol used in preparing the polymer polyol of the invention. The dispersant or stabilizer if used in preparing the seed polymer polyol may be the same or different than the dispersant or stabilizer if used in preparing the polymer polyol of the invention. The dispersant used may be any known to stabilize polymer polyols. Moreover, the dispersant may contain induced unsaturation. The seed polymer polyol may be prepared by a semi-batch or continuous process. In the preferred embodiment, the seed polymer polyol is prepared by a semi-batch process. The seed may be prepared by a process which used a seed including the process of the invention. The process conditions for preparing the seed polymer polyol are essentially the same as the process conditions for preparing the polymer polyol of the invention.

The average particle size of the seed polymer polyol generally will be within the range of from 0.1 to about 5μ, preferably from about 0.2 to about 2μ. The particle size distribution of the seed may be broad or narrow. The seed material is preferably a final polymer polyol product but may be an intermediate product; that is to say, it may contain unreacted monomers. Moreover, it is envisioned that the seed material may be comprised in whole or in part of the polymer polyol heel remaining in the reactor from the previous batch of polymer polyol prepared according to the process of the invention.

The base polyols which can be employed in this invention are polyoxyalkylene polyols having number average molecular weights up to about 10,000 or more. They are the polymerization products of an active hydrogen containing initiator (starter) with an alkylene oxide or alkylene oxide mixture. Any substance with which an alkylene oxide reacts to form a polyether polyol is suitable for use as an initiator.

Suitable initiators include glycerin, alkanolamines, alkyl amines, aryl or aromatic amines, sucrose, sorbitol, trimethylol propane, ∝-methylglucoside, β-methylglucoside, resins of phenol, aniline and mixed phenol aniline, such as methylene dianiline or Bisphenol A, Mannich condensates, and the like, and their mixtures.

The functionality of the polyol should be at least one, but can be varied by changing the structure of the initiator. Diols and triols are preferred. Any suitable alkylene oxide can be employed. The preferred alkylene oxides are ethylene oxide, propylene oxide, and 1,2-butylene oxide, and their mixtures. Propylene oxide polyols or propylene oxide/ethylene oxide copolyols are preferred. The alkylene oxides can be added separately or as a mixture to the initiator. The alkoxylation reaction may be catalyzed using any conventional catalyst such as KOH, or a double metal cyanide catalyst.

The use of a dispersant is preferred, but optional in that it may not be needed to keep the polymer particles dispersed. If employed, any suitable dispersant known to stabilize polymer polyols can be used. Suitable dispersants include glycerine initiated polyethers of alkylene oxides, polyacrylate graft polyols made by polymerizing at least one acrylate monomer or polymer in a polyol in which the resulting polyacrylate is soluble, high molecular weight polyols made using double metal cyanide catalysts, and epoxy resin-modified polyols. Also suitable for use as dispersant are polyols with added unsaturation such as maleate, fumarate, acrylate, methacrylate, and the like.

Any suitable ethylenically unsaturated monomer or mixture of monomers can be employed to produce the polymer particles in the semi-batch process of this invention. Suitable for use are all of the monomers listed in col. 7-8 of U.S. Pat. No. 5,059,641, incorporated herein by reference thereto. Preferred monomers are acrylonitrile, styrene, and vinylidene chloride. The polymerization of the monomer or monomers can be initiated using any suitable free radical polymerization initiator, such as the peroxides, persulfates, perborates, percarbonates, azo compounds, and the like. The amount of polymerization initiator employed will be that amount conventionally employed to produce polymer polyols, typically from about 0.1 to about 5 weight percent based on the total weight of monomer.

The process of the invention can be carried out at a reaction temperature within the range of from about 80° to about 150° C., preferably 90° to 130° C. The feed stream may be added to the reactor contents over a period of from about 0.5 to about 8 hours or longer, preferably, from about 1 to about 2.5 hours.

The reaction may also be carried out in the presence of an organic solvent and/or chain transfer agent, The preferred organic solvent is isopropyl alcohol. Mercaptans are the preferred chain transfer agents.

In yet another embodiment of the invention, the seed polymer polyol may be other types of polymer polyols besides those prepared from ethylenically unsaturated monomers. Other types of polymers dispersed in a polyol media are suitable as seed materials. Examples of these types of materials are: dispersions prepared from the reaction of polyamines with polyisocyanates which are commonly referred to as PHD polymer polyols, dispersions prepared from the reaction of alkanolamines with polyisocyanates which are commonly referred to as PIPA polymer polyols; and dispersions prepared from the reaction of a diamine and an epoxy resin.

The following Examples shown in table form illustrate the semi-batch process of the invention. All parts and percentages are by weight. The physical properties of the dispersions were determined by the following equipment and test methods.

Viscosity was measured using a Brookfield cone and plane viscometer Spindle #CP-52, 20 secs-1@25° C.

Particle Size was measured using a Microtrac Full Range Particle Size Analyzer with isopropyl alcohol as the dispersing media. The standard deviation (SD) is a measure of the polydispersity of the particle size distribution.

Filterability was determined by diluting 200 gms of the polymer polyol with 400 grams of isopropanol to remove any viscosity imposed limitations and gravity filtering the resulting mixture through a fixed cross sectional area of a 30µ screen. The amount of sample which passes through the screen in a 10 minute time period is reported in percent. The solid residue on the screen is rinsed with isopropanol, dried, and reported as a ppm value of the polymer polyol sample.

Centrifugable Solids were determined by centrifuging a polymer polyol sample for about 24 hours at about 3300 rpm and 1470 radial centrifugal "g" forces. The centrifuge tube is then inverted and allowed to drain for 4 hours. The non-flowing cake at the bottom of the tube is reported as a weight percent of the initial weight of the sample tested.

Two procedures (Procedure A and B) were used to produce the polymer polyols of the Examples. Both procedures are described below and the applicable procedure used in each Example is indicated in the Tables.

Procedure A

Into a 3 liter, 4 neck resin kettle equipped with stirrer, condenser, thermometer, addition tube, and under a blanket of nitrogen was charged the indicated amounts of polyol, dispersant, isopropanol, and seed polymer polyol. After heating the reactor charge to reaction temperature, the feed charge was added over the indicated time period to give a milk-white dispersion. Upon completion of the addition, the dispersion was held at the reaction temperature for 0.5 to 1.0 hr and then the reaction mixture was stripped of residual monomers for 1.5 to 2.5 hrs at 100° to 120° C. and <5 mm Hg to yield the polymer polyol.

Procedure B

Into a 8 liter, stainless steel autoclave equipped with stirrer, thermocouple, addition tube, and under a blanket of nitrogen was charged the indicated amounts of polyol, dispersant, isopropanol, and seed polymer polyol. After heating the reactor charge to reaction temperature, the feed charge was added over the indicated time period to give a milk-white dispersion. Upon completion of the addition, the dispersion was held at reaction temperature for 0.5 to 1.0 hr and then the reaction mixture was stripped of residual monomers for 1.5 to 2.5 hrs at 120° C. and <5 mm Hg to yield the polymer polyol.

The ingredients, amounts of ingredients, and methods for preparing dispersants, base polyols, and seed polymer polyols used in the Examples are described below.

Dispersant A

Dispersant A is an internally epoxy modified polyol and was prepared as outlined in U.S. Pat. No. 4,316,991 (the method of which is incorporated herein by reference). More specifically, Dispersant A is a glycerin started polyether of propylene oxide and ethylene oxide containing 16 wt % random EO and having a hydroxyl number of 21.5 modified with 1.8 wt % Epon 828 epoxy. The OH/epoxy ratio is 2.9.

Dispersant B

Dispersant B is a polyol having a hydroxyl number of about 24 containing about 0.08 meq/gm of fumarate unsaturation. It was prepared by reacting successively, propylene oxide and ethylene oxide (16 wt %) with sorbitol in the presence of potassium hydroxide catalyst to a hydroxyl number of about 28. It was then further reacted with maleic anhydride, ethylene oxide and morpholine and coupled with MDI to a viscosity of about 7000 cST.

Base Polyol A

Base Polyol A is a glycerin started polyether of propylene oxide capped with ethylene oxide containing 19% ethylene oxide and having a hydroxyl number of 35.

Base Polyol B

Base Polyol B is a glycerin started polyether of propylene oxide and ethylene oxide containing 12% random ethylene oxide and having a hydroxyl number of 48.

Base Polyol C

Base Polyol C is a glycerin started polyether of propylene oxide and ethylene oxide containing 10% random ethylene oxide and having a hydroxyl number of 52.

Seed I

Seed I is a polymer polyol containing 45 wt % SAN (75/25) dispersed in Base Polyol C and was prepared using the method of U.S. Pat. No. 5, 196,476 (the method of which is incorporated herein by reference).

Table I

Examples A–H

Examples A–H show the preparation of polymer polyols suitable for use as seed polymer polyols in the semi-batch process of this invention. All seed polymer polyols of these Examples were found to have a relatively narrow particle size distribution as indicated by their low standard deviations (SD) in the particle size analyses. These seed polymer polyols were used in the Examples of Tables. The seed polymer polyol of Example H, was not stripped of residual monomers or solvent.

TABLE I

|  | Seed | | | | | | | |
|---|---|---|---|---|---|---|---|---|
|  | A | B | C | D | E | F | G | H |
| Monomer Charge, wt % | 43 | 43 | 43 | 43 | 43 | 43 | 43 | 30 |
| S/AN Weight Ratio | 60/40 | 65/35 | 70/30 | 75/25 | 80/20 | 80/20 | 85/15 | 85/15 |
| Base Polyol | A | A | A | A | A | A | A | A |
| Isopropanol, % | 5 | 5 | 5 | 5 | 5 | 5 | 5 | 5 |
| Initiator Concentration, % | 0.75 | 0.75 | 0.75 | 0.75 | 0.75 | 0.75 | 0.75 | 0.75 |
| Reaction Temperature, °C. | 120 | 120 | 120 | 120 | 120 | 120 | 120 | 120 |
| Feed Addition Time, hr | 4 | 4 | 4 | 4 | 2 | 4 | 4 | 0.5 |
| Procedure | B | B | B | B | A | B | A | A |
| Reactor Charge: (g) | | | | | | | | |
| Base Polyol | 456 | 456 | 456 | 456 | 228 | 456 | 228 | 228 |
| Dispersant | 114 | 114 | 114 | 114 | 57 | 114 | 57 | 57 |
| Isopropanol | 100 | 100 | 100 | 100 | 20 | 100 | 20 | 0 |
| Feed Charge: (g) | | | | | | | | |
| Styrene | 1032 | 1118 | 1204 | 1290 | 688 | 1376 | 731 | 183 |
| Acrylonitrile | 688 | 602 | 516 | 430 | 172 | 344 | 129 | 32 |
| Initiator | 30 | 30 | 30 | 30 | 15 | 30 | 15 | 2.5 |
| Base Polyol | 1710 | 1710 | 1710 | 1710 | 855 | 1710 | 855 | 214 |
| Isopropanol | 100 | 100 | 100 | 100 | 80 | 100 | 80 | 25 |
| Dispersion Properties | | | | | | | | |
| Overall Monomer Conver., % | 98.4 | 98.6 | 98.4 | 97.7 | 97.1 | 96.8 | 96.1 | 84.3 |
| Viscosity, cps | 19,660 | 16,490 | 14,750 | 11,100 | 10,160 | 10,040 | 9,560 | 1,450 |
| Mean Particle Size, μ | 0.61 | 0.65 | 0.75 | 0.91 | 1.1 | 1.18 | 1.34 | 0.77 |
| Standard Deviation | 0.18 | 0.11 | 0.17 | 0.21 | 0.28 | 0.33 | — | 0.10 |
| Centrifugable Solids, Wt % | 5.5 | 5.1 | 5.1 | 4.7 | 4.8 | 4.5 | 6.1 | — |
| Filterability, on 30 μ filter | | | | | | | | |
| % through | 100 | 100 | 100 | 100 | 27 | 100 | 100 | |
| Solids on filter, ppm | 6 | 9 | 8 | 21 | 124 | 25 | 93 | — |

Seed J

Seed J is a polymer polyol containing 45 wt % SAN (67/33) dispersed in Base Polyol C, also prepared using the method of U.S. Pat. No. 5,196,476.

Seed K

Seed K is Multranol 9151 PHD polymer polyol sold by Mobay, now Miles.

Vazo 67® Initiator was the initiator used in all the polymerization reactions. Dispersant A was used in all the polymer preparations unless otherwise noted.

Table II

Examples 1–5

The data in Table II show the effect of varying the amount of seed added to the reactor charge. Example 1 is a control made with no seed. Examples 2–5 were made using the Seed D. The data clearly show that broadening in particle size distribution and reduction in viscosity are achieved by the use of a small amounts of a seed in accordance with the process of this invention. The data also indicate that if too much seed is used, polymer polyol properties deteriorate. Example 5 with 2.5 wt % seed in the reactor charge has a high viscosity with poor filtration and stability for this particular set of conditions.

TABLE II

| | Example No. # | | | | |
|---|---|---|---|---|---|
| | 1 | 2 | 3 | 4 | 5 |
| Seed | None | D | D | D | D |
| Seed, % | 0 | 1 | 1.5 | 2 | 2.5 |
| Seed SAN Ratio | 75/25 | 75/25 | 75/25 | 75/25 | 75/25 |
| Base Polyol | A | A | A | A | A |
| Monomer Charge, wt % | 43 | 43 | 43 | 43 | 43 |
| S/AN Weight Ratio | 75/25 | 75/25 | 75/25 | 75/25 | 75/25 |
| Isopropanol, % | 5 | 5 | 5 | 5 | 5 |
| Initiator Concentration, % | 0.75 | 0.75 | 0.75 | 0.75 | 0.75 |
| Reaction Temperature, °C. | 120 | 120 | 120 | 120 | 120 |
| Feed Addition Time, hr | 4 | 4 | 4 | 4 | 4 |
| Procedure | B | B | B | B | B |
| Reactor Charge: (g) | | | | | |
| Base Polyol | 456 | 456 | 456 | 456 | 456 |
| Dispersant | 114 | 114 | 114 | 114 | 114 |
| Seed | 0 | 100 | 150 | 200 | 250 |
| Isopropanol | 100 | 100 | 100 | 100 | 100 |
| Feed Charge: (g) | | | | | |
| Styrene | 1290 | 1290 | 1290 | 1290 | 1290 |
| Acrylonitrile | 430 | 430 | 430 | 430 | 430 |
| Initiator | 30 | 30 | 30 | 30 | 30 |
| Base Polyol | 1710 | 1710 | 1710 | 1710 | 1710 |
| Isopropanol | 100 | 100 | 100 | 100 | 100 |
| Dispersion Properties | | | | | |
| Overall Monomer Conversion, % | 97.7 | 97.7 | 97.6 | 97.6 | 97.1 |
| Viscosity, cps | 11,100 | 9,300 | 8,800 | 10,900 | 24,300 |
| Mean Particle Size, μ | 0.91 | 1.59 | 1.63 | 1.72 | 1.79 |
| Standard Deviation | 0.21 | 0.98 | 0.8 | 0.65 | 0.55 |
| Centrifugable Solids, Wt % | 4.7 | 4.8 | 5.4 | 7.0 | 9.7 |
| Filterability, on 30 μ filter | | | | | |
| % through | 100 | 100 | 100 | 100 | 76 |
| Solids on filter, ppm | 21 | 28 | 20 | 37 | 59 |

Table III

Examples 6–10

The broadening of particle size distribution and the reduction in viscosity achieved using a small amount of a seed at a high styrene content (80%) and a high solids content is illustrated in Table III. Example 6 is a control example in which no was added. Examples 7–10 were made using the Seed E. The data also indicate (Example 7) that 0.5% seed is effective. The filtration properties are also improved with the use of small amounts of a seed.

TABLE III

| | Example No. | | | | |
|---|---|---|---|---|---|
| | 6 | 7 | 8 | 9 | 10 |
| Seed | none | E | E | E | E |
| Seed, % | none | 0.5 | 1 | 1.5 | 2 |
| Seed SAN Ratio | 80/20 | 80/20 | 80/20 | 80/20 | 80/20 |
| Base Polyol | A | A | A | A | A |
| Monomer Charge, wt % | 43 | 43 | 43 | 43 | 43 |
| S/AN Weight Ratio | 80/20 | 80/20 | 80/20 | 80/20 | 80/20 |
| Isopropanol, % | 5 | 5 | 5 | 5 | 5 |
| Initiator Concentration, % | 0.75 | 0.75 | 0.75 | 0.75 | 0.75 |
| Reaction Temperature, °C. | 120 | 120 | 120 | 120 | 120 |
| Feed Addition Time, hr | 2 | 2 | 2 | 2 | 2 |
| Procedure | A | A | A | A | A |
| Reactor Charge: (g) | | | | | |
| Base Polyol | 228 | 228 | 228 | 228 | 228 |
| Dispersant | 57 | 57 | 57 | 57 | 57 |

TABLE III-continued

| | Example No. | | | | |
|---|---|---|---|---|---|
| | 6 | 7 | 8 | 9 | 10 |
| Seed | 0 | 25 | 50 | 70 | 100 |
| Isopropanol | 20 | 20 | 20 | 20 | 20 |
| Feed Charge: (g) | | | | | |
| Styrene | 688 | 688 | 688 | 688 | 688 |
| Acrylonitrile | 172 | 172 | 172 | 172 | 172 |
| Initiator | 15 | 15 | 15 | 15 | 15 |
| Base Polyol | 855 | 855 | 855 | 855 | 855 |
| Isopropanol | 80 | 80 | 80 | 80 | 80 |
| Dispersion Properties | | | | | |
| Overall Monomer Conversion, % | 97.1 | 96.4 | 96.4 | 96.6 | 96.6 |
| Viscosity, cps | 10,160 | 9560 | 7640 | 7560 | 7640 |
| Mean Particle Size, μ | 1.1 | 1.32 | 2.16 | 2.15 | 2.26 |
| Standard Deviation | 0.28 | 0.52 | 1.77 | 1.52 | 1.28 |
| Centrifugable Solids, Wt % | 4.8 | 4.7 | 7.4 | 9.4 | 8.2 |
| Filterability, on 30 μ filter | | | | | |
| % through | | 27 | 100 | 100 | 100 | 66 |
| Solids on filter, ppm | 124 | 103 | 30 | 18 | 324 |

Table IV

Examples 11–14

Example 11 is a control example prepared using no seed. Examples 12–14 show the effect of adding Seed G to the reactor (Example 13), to the feed (Example 14), and to both the reactor and feed (Example 12).

TABLE IV

| | Example No. # | | | |
|---|---|---|---|---|
| | 11 | 12 | 13 | 14 |
| Seed | None | G | G | G |
| Seed, % | 0 | 1 | 1 | 1 |
| % Seed in Reactor | 0 | 40 | 100 | 0 |
| % Seed in Feed | 0 | 60 | 0 | 100 |
| Base Polyol | A | A | A | A |
| Monomer Charge, wt % | 43 | 43 | 43 | 43 |
| S/AN Weight Ratio | 80/20 | 80/20 | 80/20 | 80/20 |
| Isopropanol, % | 5 | 5 | 5 | 5 |
| Initiator Concentration, % | 0.75 | 0.75 | 0.75 | 0.75 |
| Reaction Temperature, °C. | 120 | 120 | 120 | 120 |
| Feed Addition Time, hr | 4 | 4 | 4 | 4 |
| Procedure | B | B | B | B |
| Reactor Charge: (g) | | | | |
| Base Polyol | 433 | 433 | 399 | 456 |
| Dispersant | 137 | 114 | 114 | 114 |
| Seed | 0 | 40 | 100 | 0 |
| Isopropanol | 0 | 50 | 100 | 50 |
| Feed Charge: (g) | | | | |
| Styrene | 1376 | 1339 | 1339 | 1339 |
| Acrylonitrile | 344 | 338 | 338 | 338 |
| Initiator | 30 | 30 | 30 | 30 |
| Base Polyol | 1710 | 1676 | 1710 | 1653 |
| Seed | 0 | 60 | 0 | 100 |
| Isopropanol | 200 | 150 | 100 | 150 |
| Dispersion Properties | | | | |
| Overall Monomer Conver., % | 96.2 | 96.7 | 97.4 | 97.3 |
| Viscosity, cps | 10,700 | 8300 | 8600 | 8600 |
| Mean Particle Size, μ | 0.93 | 1.66 | 1.78 | 1.62 |
| Standard Deviation | 0.27 | 0.81 | 1.21 | 0.77 |
| Centrifugable Solids, Wt % | 4.0 | 6.2 | 5.1 | 5.5 |
| Filterability, on 30 μ filter | | | | |
| % through | 100 | 100 | 100 | 100 |

TABLE IV-continued

| | Example No. # | | | |
|---|---|---|---|---|
| | 11 | 12 | 13 | 14 |
| Solids on filter, ppm | 9 | 18 | 15 | 24 |

Table V

Examples 15–20

The effect of different monomer (SAN) ratios in the seed is shown in Table V. Moreover, the data further show that the SAN ratio of the seed polymer polyol can be different than the SAN ratio of the polymer polyol produced by the process of the invention. Seed A–G containing from 60 to 85% styrene were used.

TABLE V

| | Example No. # | | | | | |
|---|---|---|---|---|---|---|
| | 15 | 16 | 17 | 18 | 19 | 20 |
| Seed | A | B | C | D | F | G |
| Seed % | 1 | 1 | 1 | 1 | 1 | 1 |
| Seed SAN Ratio | 60/40 | 65/35 | 70/30 | 75/25 | 80/20 | 85/15 |
| Base Polyol | A | A | A | A | A | A |
| Monomer Charge, wt % | 43 | 43 | 43 | 43 | 43 | 43 |
| S/AN Weight Ratio | 80/20 | 80/20 | 80/20 | 80/20 | 80/20 | 80/20 |
| Isopropanol, % | 5 | 5 | 5 | 5 | 5 | 5 |
| Initiator Concentration, % | 0.75 | 0.75 | 0.75 | 0.75 | 0.75 | 0.75 |
| Reaction Temperature, °C. | 120 | 120 | 120 | 120 | 120 | 120 |
| Feed Addition Time, hr | 4 | 4 | 4 | 4 | 4 | 4 |
| Procedure | B | B | B | B | B | B |
| Reactor Charge: (g) | | | | | | |
| Base Polyol | 456 | 456 | 456 | 456 | 456 | 456 |
| Dispersant | 114 | 114 | 114 | 114 | 114 | 114 |
| Seed | 100 | 100 | 100 | 100 | 100 | 100 |
| Isopropanol | 100 | 100 | 100 | 100 | 100 | 100 |
| Feed Charge: (g) | | | | | | |
| Styrene | 1376 | 1376 | 1376 | 1376 | 1376 | 1376 |
| Acrylonitrile | 344 | 344 | 344 | 344 | 344 | 344 |
| Initiator | 30 | 30 | 30 | 30 | 30 | 30 |
| Base Polyol | 1710 | 1710 | 1710 | 1710 | 1710 | 1710 |
| Isopropanol | 100 | 100 | 100 | 100 | 100 | 100 |
| Dispersion Properties | | | | | | |
| Overall Monomer Conver., % | 97.2 | 96.7 | 97.2 | 97.1 | 96.9 | 97.4 |
| Viscosity, cps | 12,200 | 9880 | 10,040 | 8070 | 8480 | 8600 |
| Mean Particle Size, μ | 8.6 | 7.2 | 1.74 | 1.91 | 1.93 | 1.78 |
| Standard Deviation | 13 | 8.7 | 0.73 | 1.04 | 1.32 | 1.21 |
| Centrifugable Solids, Wt % | 24 | 30 | 6.87 | 7.18 | 5.8 | 5.14 |
| Filterability, on 30 μ filter | | | | | | |
| % through | 1 | 1 | 100 | 100 | 100 | 100 |
| Solids on filter, ppm | 77,000 | 34,000 | 57 | 32 | 29 | 15 |

Table VI

Examples 21 and 22

The data in Table VI show that broadening in particle size distribution and reduction in viscosity are achieved by the use of a small amount of a seed polymer polyol in accordance with the process of this invention when dodecylmercaptan is used as a chain transfer agent. Example 21 is a control example in which no seed polymer polyol was added. Example 22 used the polymer polyol of Example 21 as a seed.

TABLE VI

| | Example No. # | |
|---|---|---|
| | 21 | 22 |
| Seed | None | Example #21 |
| Monomer Charge, wt % | 40 | 40 |
| Seed, % | 0 | 1 |
| Seed SAN Ratio | — | 70/30 |
| S/AN Weight Ratio | 70/30 | 70/30 |
| Base Polyol | A | A |
| Dodecylmercaptan, % | 0.3 | 0.3 |
| Initiator Concentration, % | 0.75 | 0.75 |
| Reaction Temperature, °C. | 120 | 120 |
| Feed Addition Time, hr | 4 | 4 |
| Procedure | A | A |
| Reactor Charge: (g) | | |
| Base Polyol | 240 | 240 |
| Dispersant | 60 | 60 |
| Seed | 0 | 50 |

TABLE VI-continued

| | Example No. # | |
|---|---|---|
| | 21 | 22 |
| Feed Charge: (g) | | |
| Styrene | 560 | 560 |
| Acrylonitrile | 240 | 240 |
| Initiator | 15 | 15 |
| Base Polyol | 900 | 900 |
| Dodecylmercaptan | 6 | 6 |
| Dispersion Properties | | |
| Viscosity, cps | 15,200 | 13,700 |
| Mean Particle Size, μ | 0.7 | 1.2 |
| Standard Deviation | 0.11 | 0.65 |
| Centrifugable Solids, Wt % | 5.5 | 5.5 |
| Filterability, on 30 μ filter | | |
| % through | 100 | 100 |
| Solids on filter, ppm | 6 | 3 |

Table VII

Examples 23–25

Table VII shows that a portion of the seed can be added to the feed charge. All of the Examples have a significantly lower viscosity and broader particle size distribution as compared to the polymer polyol of Example 11 prepared with no seed.

TABLE VII

|  | Example No. # | | |
|---|---|---|---|
|  | 23 | 24 | 25 |
| Seed | H | G | Example #24 |
| Seed Particle Size, µ | 0.71 | 1.34 | 1.66 |
| Seed, % | 1 | 1 | 1 |
| Seed SAN Ratio | 85/15 | 85/15 | 80/20 |
| Seed in Polyol, % | 29 | 43 | 43 |
| Monomer Charge, wt % | 43 | 43 | 43 |
| S/AN Weight Ratio | 80/20 | 80/20 | 80/20 |
| Base Polyol | A | A | A |
| Isopropanol, % | 5 | 5 | 5 |
| Reaction Temperature, °C. | 120 | 120 | 120 |
| Feed Addition Time, hr | 4 | 4 | 4 |
| Procedure | B | B | B |
| Reactor Charge: (g) | | | |
| Base Polyol | 420 | 433 | 433 |
| Dispersant | 110 | 114 | 114 |
| Seed Polyol | 60 | 40 | 40 |
| Isopropanol | 50 | 50 | 50 |
| Feed Charge: (g) | | | |
| Styrene | 1339 | 1339 | 1342 |
| Acrylonitrile | 338 | 338 | 335 |
| Initiator | 30 | 30 | 30 |
| Base Polyol | 1648 | 1676 | 1676 |
| Isopropanol | 145 | 150 | 150 |
| Seed Polyol | 90 | 60 | 60 |
| Dispersion Properties | | | |
| Overall Monomer Conversion, % | 98.7 | 96.7 | 97.1 |
| Viscosity, cps | 8650 | 8300 | 8770 |
| Mean Particle Size, µ | 1.56 | 1.66 | 1.18 |
| Standard Deviation | 0.65 | 0.81 | 0.42 |
| Centrifugable Solids, Wt % | 5.3 | 6.2 | 4.6 |
| Filterability, on 30 µ filter | | | |
| % through | 100 | 100 | 100 |
| Solids on filter, ppm | 15 | 18 | 9 |

Table VIII

Example 26–33

Example 26 demonstrates that the seed (Seed H) may contain unreacted monomers and solvent and still be effective in this invention. Example 29 is a control example in which no seed was added. Examples 28 and 31 demonstrate the use of a seed prepared via a seeding process. Examples 32 and 33 show that poor properties are obtained if too much seed (4%) is used.

TABLE VIII

|  | Example No. # | | | | | | | |
|---|---|---|---|---|---|---|---|---|
|  | 26 | 27 | 28 | 29 | 30 | 31 | 32 | 33 |
| Seed | H | E | Examp. #27 | — | Examp. #29 | Examp. #30 | Examp. #30 | Examp. #30 |
| Seed particle Size µ | 0.71 | 1.08 | 1.82 | 0.91 | 1.59 | 1.59 | 1.59 | |
| Seed, % | 1 | 1 | 1 | — | 1 | 1 | 4 | 4 |
| Monomer Charge, wt % | 43 | 43 | 43 | 43 | 43 | 43 | 43 | 43 |
| S/AN Weight Ratio | 80/20 | 80/20 | 80/20 | 75/25 | 75/25 | 75/25 | 75/25 | 75/25 |
| Base Polyol | A | A | A | A | A | A | A | A |
| Isopropanol, % | 5 | 5 | 5 | 5 | 5 | 5 | 5 | 5 |
| Reaction Temperature, °C. | 120 | 120 | 120 | 120 | 120 | 120 | 120 | 120 |
| Feed Addition Time, hr | 4 | 4 | 4 | 4 | 4 | 4 | 4 | 4 |
| Procedure | A | A | A | B | B | B | B | B |
| Reactor Charge: (g) | | | | | | | | |
| Base Polyol | 228 | 228 | 228 | 456 | 456 | 456 | 456 | 456 |
| Dispersant | 57 | 57 | 57 | 114 | 114 | 114 | 114 | 114 |
| Seed Polyol | 50 | 50 | 50 | 0 | 100 | 100 | 400 | 0 |
| Isopropanol | 20 | 20 | 20 | 100 | 100 | 100 | 100 | 100 |
| Feed Charge: (g) | | | | | | | | |
| Styrene | 688 | 688 | 688 | 1290 | 1290 | 1290 | 1290 | 1290 |
| Acrylonitrile | 172 | 172 | 172 | 430 | 430 | 430 | 430 | 430 |
| Initiator | 15 | 15 | 15 | 30 | 30 | 30 | 30 | 30 |
| Base Polyol | 855 | 855 | 855 | 1710 | 1710 | 1710 | 1710 | 1710 |
| Isopropanol | 80 | 80 | 80 | 100 | 100 | 100 | 100 | 100 |
| Seed Polyol | 0 | 0 | 0 | 0 | 0 | 0 | 0 | 400 |
| Dispersion Properties | | | | | | | | |
| Overall Monomer Conver., % | 96.6 | 96.8 | 96.5 | 97.7 | 97.7 | 97.8 | 97.3 | 97.3 |
| Viscosity, cps | 8870 | 8730 | 8850 | 11,060 | 9,270 | 9,480 | 39,220 | 10,770 |
| Mean Particle Size, µ | 1.6 | 1.82 | 1.54 | 0.91 | 1.59 | 1.29 | 1.42 | 0.94 |
| Standard Deviation | 0.92 | 1.2 | 0.91 | 0.21 | 0.98 | 0.69 | 0.39 | 0.39 |
| Centrifugable Solids, Wt % | 4.6 | 5.4 | 5.1 | 4.7 | 4.8 | 4.8 | — | — |
| Filterability, on 30 µ filter | | | | | | | | |
| % through | 100 | 100 | 97 | 100 | 100 | 100 | 100 | 43 |
| Solids on filter, ppm | 29 | 57 | 86 | 21 | 28 | 18 | 15 | 77 |

Table IX

Examples 34–37

The data in Table IX show the effect of the invention on low solids content polymer polyols. Even at these low (25%) solids contents, the use of a small amount of a seed results in the broadening of particle size distribution and the reduction in viscosity. Examples 34 and 36 are control examples in which no seed was added. Examples 34 and 35 are experiments in which a dispersant containing induced unsaturation was used.

TABLE IX

| | Example No. # | | | |
|---|---|---|---|---|
| | 34 | 35 | 36 | 37 |
| Seed | — | Examp. #34 | — | Examp. #36 |
| Seed % | — | 1 | — | 1 |
| Dispersant | B | B | A | A |
| Base Polyol | A | A | A | A |
| Monomer Charge, wt % | 25 | 25 | 25 | 25 |
| S/AN Weight Ratio | 70/30 | 70/30 | 70/30 | 70/30 |
| Initiator Concentration, % | 0.75 | 0.75 | 0.75 | 0.75 |
| Reaction Temperature, °C. | 120 | 120 | 120 | 120 |
| Feed Addition Time, hr | 2 | 2 | 2 | 2 |
| Procedure | A | A | A | A |
| Reactor Charge: (g) | | | | |
| Base Polyol | 330 | 330 | 315 | 315 |
| Dispersant | 45 | 45 | 60 | 60 |
| Seed | — | 50 | — | 50 |
| Feed Charge: (g) | | | | |
| Styrene | 350 | 350 | 350 | 350 |
| Acrylonitrile | 150 | 150 | 150 | 150 |
| Initiator | 15 | 15 | 15 | 15 |
| Base Polyol | 1125 | 1125 | 1125 | 1125 |
| Dispersion Properties | | | | |
| Viscosity, cps | 3150 | 2900 | 3360 | 2790 |
| Mean Particle Size, μ | 0.22 | 0.44 | 0.57 | 0.96 |
| Standard Deviation | 0.07 | 0.11 | 0.09 | 0.45 |
| Filterability, on 30 μ filter | | | | |
| % through | 100 | 100 | 100 | 100 |
| Solids on filter, ppm | 5 | 4 | 3 | 2 |

Table X

Examples 38–42

The data in Table X show the effect of seed amount in Base Polyol B when all of the seed polymer polyol is added to the reactor charge. The data clearly show that broadening in particle size distribution and reduction in viscosity are achieved by the use of a small amount of a seed polymer polyol in accordance with the process of this invention. Example 38 is a control example in which no seed polymer polyol was added. The data also indicate that if too much seed is used polymer polyol properties deteriorate. Example 41 produced with 5 wt % seed in the reactor charge has poorer filtration and stability as well as a more narrow particle size distribution than the examples produced with 1 wt % and 2 wt % seed. In Example 42, Seed I was prepared by a continuous process.

TABLE X

| | Example No. # | | | | |
|---|---|---|---|---|---|
| | 38 | 39 | 40 | 41 | 42 |
| Seed | None | Ex 38 | Ex 38 | Ex 38 | I |
| Seed, % | 0 | 1 | 2 | 5 | 1 |
| Seed SAN Ratio | None | 75/25 | 75/25 | 75/25 | 75/25 |
| Base Polyol | B | B | B | B | B |
| Monomer Charge, wt % | 45 | 45 | 45 | 45 | 45 |
| S/AN Weight Ratio | 75/25 | 75/25 | 75/25 | 75/25 | 75/25 |
| Isopropanol, % | 4.5 | 4.5 | 4.5 | 4.5 | 4.5 |
| Initiator Concentration, % | 0.8 | 0.8 | 0.8 | 0.8 | 0.8 |
| Reaction Temperature, °C. | 120 | 120 | 120 | 120 | 120 |
| Feed Addition Time, hr | 2 | 2 | 2 | 2 | 2 |
| Procedure | A | A | A | A | A |
| Reactor Charge: (g) | | | | | |
| Base Polyol | 220 | 220 | 220 | 220 | 220 |
| Dispersant | 55 | 55 | 55 | 55 | 55 |
| Seed | 0 | 44 | 89 | 222 | 44 |
| Isopropanol | 20 | 20 | 20 | 20 | 20 |
| Feed Charge: (g) | | | | | |
| Styrene | 675 | 660 | 645 | 600 | 660 |
| Acrylonitrile | 225 | 220 | 215 | 200 | 220 |
| Initiator | 16 | 16 | 16 | 16 | 16 |
| Base Polyol | 825 | 800 | 775 | 703 | 800 |
| Isopropanol | 70 | 70 | 70 | 70 | 70 |
| Dispersion Properties | | | | | |
| Viscosity, cps | 7750 | 6630 | 6130 | 6960 | 7570 |
| Mean Particle Size, μ | 1.01 | 1.79 | 2.01 | 1.63 | 1.39 |
| Standard Deviation | 0.34 | 1.32 | 1.16 | 0.51 | 0.79 |
| Centrifugable Solids, Wt % | 4.9 | 4.8 | 5.9 | 9.7 | — |
| Filterability, on 30 μ filter | | | | | |
| % through | 100 | 100 | 100 | 100 | 18 |
| Solids on filter, ppm | 40 | 20 | 37 | 151 | 52 |

Table XI

Examples 43–48

The data in Table XI illustrate the flexibility of the process of the invention with regard to the point of seed addition. The data show that the improvements are obtained if the seed is added in the initial reactor charge, or added with the feed, or added in both. Example 43 is a control example in which no seed was added. The data also indicate that if too much seed is used, polymer polyol properties deteriorate. Example 48 produced with 5 wt % seed in the feed has poorer filtration and stability as well as a more narrow particle size distribution than the examples produced with 1 wt % and 2.5 wt % seed.

TABLE XI

| | Example No. | | | | | |
|---|---|---|---|---|---|---|
| | 43 | 44 | 45 | 46 | 47 | 48 |
| Seed # | None | Ex 43 | Ex 43 | Ex 43 | Ex 43 | Ex 43 |
| Seed, % in Reactor Charge | 0 | 1 | 0 | 0 | 1.25 | 0 |
| Seed, % in Feed | 0 | 0 | 1 | 2.5 | 1.25 | 5 |
| Seed SAN Ratio | None | 75/25 | 75/25 | 75/25 | 75/25 | 75/25 |
| Base Polyol | B | B | B | B | B | B |
| Monomer Charge, wt % | 45 | 45 | 45 | 45 | 45 | 45 |
| S/AN Weight Ratio | 75/25 | 75/25 | 75/25 | 75/25 | 75/25 | 75/25 |
| Isopropanol, % | 5 | 4 | 4 | 4 | 4 | 4 |
| Initiator Concentration, % | 0.8 | 0.8 | 0.8 | 0.8 | 0.8 | 0.8 |
| Reaction Temperature, °C. | 120 | 120 | 120 | 120 | 120 | 120 |
| Feed Addition Time, hr | 4 | 4 | 4 | 4 | 4 | 4 |
| Procedure | B | B | B | B | B | B |
| Reactor Charge: (g) | | | | | | |
| Base Polyol | 440 | 440 | 440 | 440 | 440 | 440 |
| Dispersant | 110 | 110 | 110 | 110 | 110 | 110 |
| Seed | 0 | 89 | 0 | 0 | 111 | 0 |
| Isopropanol | 40 | 40 | 40 | 40 | 40 | 40 |
| Feed Charge: (q) | | | | | | |
| Styrene | 1350 | 1320 | 1320 | 1275 | 1275 | 1200 |
| Acrylonitrile | 450 | 440 | 440 | 425 | 425 | 400 |
| Seed | 0 | 0 | 89 | 222 | 111 | 444 |
| Initiator | 32 | 32 | 32 | 32 | 32 | 32 |
| Base Polyol | 1650 | 1600 | 1600 | 1534 | 1534 | 1406 |
| Isopropanol | 160 | 120 | 120 | 120 | 120 | 120 |
| Dispersion Properties | | | | | | |
| Viscosity, cps | 9180 | 7630 | 7900 | 7990 | 6430 | 8040 |
| Mean Particle Size, μ | 0.87 | 1.34 | 1.07 | 1 | 1.81 | 0.9 |
| Standard Deviation | 0.15 | 0.8 | 0.34 | 0.32 | 1.32 | 0.3 |
| Filterability, on 30 μ filter | | | | | | |
| % through | 100 | 100 | 100 | 50 | 100 | 16 |
| Solids on filter, ppm | 40 | 10 | 22 | 48 | 34 | 156 |

Table XII

Examples 49–54

The data in Table XII show the effect of seed amount on low solids content dispersions. Example 49 is a control example in which no seed was added. The data also show that if too much seed is used, as in Example 48 with 5 wt % seed in the reactor charge, the product has a more narrow particle size distribution than one produced with 1 wt % seed. Example 53 demonstrates that the solids content of the seed can be different than the solids content of the resulting polymer polyol. Example 53 also demonstrates the use of a seed produced via a continuous process. Example 54 demonstrates the use of a seed which is not based on ethylenically unsaturated monomers and thus shows that other types of dispersions are effective at producing a broad particle size distribution using the semi-batch process of the invention.

TABLE XII

| | Example No. # | | | | | |
|---|---|---|---|---|---|---|
| | 49 | 50 | 51 | 52 | 53 | 54 |
| Seed | None | Ex 49 | Ex 49 | Ex 49 | J | K |
| Seed, % | 0 | 1 | 2 | 5 | 1 | 1 |
| Solid Content of Seed, wt % | None | 25 | 25 | 25 | 45 | 20 |
| Seed SAN Ratio | None | 75/25 | 75/25 | 75/25 | 67/33 | Not SAN |
| Base Polyol | B | B | B | B | B | B |
| Monomer Charge, wt % | 25 | 25 | 25 | 25 | 25 | 25 |
| S/AN Weight Ratio | 75/25 | 75/25 | 75/25 | 75/25 | 75/25 | 75/25 |
| Initiator Concentration, % | 0.6 | 0.6 | 0.6 | 0.6 | 0.6 | 0.6 |
| Reaction Temperature, °C. | 120 | 120 | 120 | 120 | 120 | 120 |
| Feed Addition Time, hr | 3 | 3 | 3 | 3 | 3 | 3 |
| Procedure | A | A | A | A | A | A |

TABLE XII-continued

| | Example No. # | | | | | |
|---|---|---|---|---|---|---|
| | 49 | 50 | 51 | 52 | 53 | 54 |
| Reactor Charge: (g) | | | | | | |
| Base Polyol | 248 | 248 | 248 | 248 | 248 | 248 |
| Dispersant | 64 | 64 | 64 | 64 | 64 | 64 |
| Seed | 0 | 80 | 160 | 400 | 44 | 100 |
| Feed Charge: (g) | | | | | | |
| Styrene | 350 | 336 | 322 | 280 | 336 | 336 |
| Acrylonitrile | 150 | 144 | 138 | 120 | 144 | 144 |
| Initiator | 12 | 12 | 12 | 12 | 12 | 12 |
| Base Polyol | 1176 | 1116 | 1096 | 888 | 1052 | 1096 |
| Dispersion Properties | | | | | | |
| Overall Monomer Conver., % | 95.9 | ND | 94.3 | 94.7 | 94.3 | ND |
| Viscosity, cps | 1980 | 1980 | 1910 | 2300 | 2000 | 4400 |
| Mean Particle Size, μ | 0.53 | 0.80 | 0.89 | 0.81 | 0.86 | 1.20 |
| Standard Deviation | 0.07 | 0.36 | 0.15 | 0.11 | 0.38 | 0.59 |
| Filterability, on 30 μ filter | | | | | | |
| % through | 100 | 100 | 100 | 100 | 87 | 100 |
| Solids on filter, ppm | 1 | 4 | 4 | 1 | 12 | 3 |

Table XIII

Examples 55–57

The data in Table XIII show that even at a seed amount of as little as 0.25 weight % (i.e. 0.25% of total polymer solids come from the seed) the semi-batch process of this invention is effective at producing a polymer polyol having a broader particle size distribution as compared to the same polymer polyol prepared in the absence of the seed. Example 55 is a control example in which no seed was used. Examples 56 and 57 are examples according to the invention and show the improvements attained using 0.25% and 1% seed, respectively.

TABLE XIII

| | Example No. # | | |
|---|---|---|---|
| | 55 | 56 | 57 |
| Seed | — | Example #55 | Example #55 |
| Seed, % | — | 0.25 | 1 |
| Seed SAN Ratio | — | 75/25 | 75/25 |
| Base polyol | A | A | A |
| Monomer Charge, wt % | 44 | 44 | 44 |
| S/AN Weight Ratio | 75/25 | 75/25 | 75/25 |
| Dispersant of Total Polyol | 5 | 5 | 5 |
| Isopropanol, % | 5 | 5 | 5 |
| Initiator Concentration, % | 0.75 | 0.75 | 0.75 |
| Reaction Temperature, °C. | 120 | 120 | 120 |
| Feed Addition Time, hr | 2 | 2 | 2 |
| Procedure | B | B | B |
| Reactor Charge: (g) | | | |
| Base Polyol | 448 | 448 | 448 |
| Dispersant | 112 | 112 | 112 |
| Seed | — | 25 | 100 |
| Isopropanol | 100 | 100 | 100 |
| Feed Charge: (g) | | | |
| Styrene | 1320 | 1320 | 1320 |
| Acrylonitrile | 440 | 440 | 440 |
| Initiator | 30 | 30 | 30 |
| Base Polyol | 1680 | 1680 | 1680 |
| Isopropanol | 100 | 100 | 100 |

TABLE XIII-continued

| | Example No. # | | |
|---|---|---|---|
| | 55 | 56 | 57 |
| Dispersion Properties | | | |
| Overall Monomer Conversion, % | 98.0 | 98.0 | 98.0 |
| Viscosity, cps | 11,840 | 11,750 | 10,030 |
| Mean Particle Size, μ | 1.00 | 0.98 | 1.60 |
| Standard Deviation | 0.22 | 0.32 | 1.02 |
| Filterability, on 30 μ filter | | | |
| % through | 100 | 100 | 100 |
| Solids on filter, ppm | 2 | 5 | 12 |

The polymer polyols prepared by the semi-batch process of this invention can be employed to produce polyurethanes. The polymer polyols are particularly suitable for use in producing flexible polyurethane foams using conventional art-recognized amounts of polyurethane foam materials and conventional foam forming methods. U.S. Pat. Nos. 4,883,825 and 4,891,395 describe in detail polyurethane foam materials, formulations, and methods, and are incorporated herein by reference thereto.

It will be evident from the foregoing that various modifications can be made to the method of this invention. Such, however, are considered to be within the scope of the invention.

What is claimed is:

1. A semi-batch process for preparing a final polymer polyol comprising the in-situ polymerization in a batch reactor of one or more ethylenically unsaturated monomers in a polyether polyol media in the presence of a seed polymer polyol, wherein from about 0.25 to about 3 weight percent of the polymer solids in the final polymer polyol comes from the seed polymer polyol, and wherein the final polymer polyol has a broader particle size distribution as compared to an identically prepared polymer polyol prepared in the absence of the seed polymer polyol.

2. The semi-batch process of claim 1 in which the seed polymer polyol contributes from abut 0.5 to about 2.5 weight percent of the polymer solids in the final polymer polyol.

3. The semi-batch process of claim 1 in which the seed polymer polyol contributes from abut 0.5 to about 2 weight percent of the polymer solids in the final polymer polyol.

4. The semi-batch process of claim 1 in which the seed polymer polyol is initially charged to the reactor.

5. The semi-batch process of claim 1 in which the seed polymer polyol and the polyether polyol media are premixed and initially charged to the reactor.

6. The semi-batch process of claim 1 in which the seed polymer polyol is added as a feed stream into the reactor.

7. The semi-batch process of claim 1 in which the one or more ethylenically unsaturated-monomers and the seed polymer polyol are premixed and added as a feed stream into the reactor.

8. The semi-batch process of claim 1 in which the polyether polyol and the seed polymer polyol are premixed and added as a feed stream into the reactor.

9. The semi-batch process of claim 1 in which a portion of the seed polymer polyol is initially charged to the reactor and the balance is added as a feed stream into the reactor.

10. The semi-batch process of claim 1 in which the seed polymer polyol is prepared by a semi-batch process.

11. The semi-batch process of claim 1 in which the seed polymer polyol is prepared by a continuous process.

12. The semi-batch process of claim 1 in which the seed polymer polyol has an average particle size within the range of from about 0.1 to about 5μ.

13. The semi-batch process of claim 1 in which the seed polymer polyol has an average particle size within the range of from about 0.2 to about 2μ.

14. The semi-batch process of claim 1 in which the seed polymer polyol is prepared by the in-situ polymerization of one or more ethylenically unsaturated monomers in a polyether polyol media.

15. The semi-batch process of claim 14 in which the seed polymer polyol is prepared by the in-situ polymerization of styrene.

16. The semi-batch process of claim 14 in which the seed is prepared by the in-situ polymerization of styrene and acrylonitrile.

17. The semi-batch process of claim 16 in which the ratio of styrene to acrylonitrile is within the range of from about 40/60 to about 95/5.

18. The semi-batch process of claim 16 in which the ratio of styrene to acrylonitrile is within the range of from about 65/35 to about 90/10.

19. The semi-batch process of claim 1 in which the seed is a PHD polymer polyol prepared from the reaction of polyamines with isocyanates.

20. The semi-batch process of claim 1 in which the seed is a PIPA polymer polyol prepared from the reaction of alkanolamines with polyisocyanates.

21. The semi-batch process of claim 1 in which the seed is prepared from the reaction of a diamine and an epoxy resin.

22. The semi-batch process of claim 1 in which the final polymer polyol has a lower viscosity as compared to an identically prepared polymer polyol prepared in the absence of the seed polymer polyol.

23. The semi-batch process of claim 1 in which the seed polymer polyol has a solids content of from about 10 to about 60 weight percent.

24. The semi-batch process of claim 1 in which the seed polymer polyol has the same solids content as the final polymer polyol.

25. The semi-batch process of claim 1 in which the seed polymer polyol is prepared using the same monomers as the final polymer polyol.

26. The semi-batch process of claim 1 in which the seed polymer polyol is prepared using the same base polyether polyol media as the final polymer polyol.

27. The semi-batch process of claim 1 in which the composition of the seed polymer polyol is substantially identical to the composition of the final polymer polyol.

28. The semi-batch process of claim 1 in which the in-situ polymerization is carried out at a reaction temperature within the range of from about 80° to about 150° C.

29. The semi-batch process of claim 1 in which the in-situ polymerization is carried out at a reaction temperature within the range of from about 90° to about 130° C.

30. The semi-batch process of claim 1 in which the reactants are added to the reactor by an initial reactor charge, as a feed stream, or both.

\* \* \* \* \*